United States Patent [19]

Primak

[11] 3,867,185

[45] Feb. 18, 1975

[54] METHOD OF PRODUCING A LITHIUM-DEPLETED PATTERNED SURFACE ON A LITHIUM NIOBATE CRYSTAL

[75] Inventor: William L. Primak, Hinsdale, Ill.

[73] Assignee: The United States of America as represented by the United States Atomic Energy Commission, Washington, D.C.

[22] Filed: Sept. 17, 1973

[21] Appl. No.: 398,266

[52] U.S. Cl............ 117/118, 117/93.3, 117/160 R, 117/169 R
[51] Int. Cl............................................. B44d 5/12
[58] Field of Search............ 117/118, 160 R, 169 R, 117/93.3, 93.1 GD; 307/88.3

[56] References Cited
UNITED STATES PATENTS
3,402,073  9/1968  Pierce et al...................... 117/93.1
3,679,907  7/1972  Bonner et al..................... 307/88.3

OTHER PUBLICATIONS

Boyd et al., "LiNbO$_3$: An Efficient Phase Matchable Nonlinear Optical Material," Applied Physics Letters, pp. 234–235, 12/1/64.

Fay et al., "Dependence of Second-Harmonic Phase-Matching Temperature in LiNbO$_3$ Crystals on Melt Composition," Applied Physics Letters, pp. 89–91, 2/1/68.

Primary Examiner—William D. Martin
Assistant Examiner—Sadie L. Childs
Attorney, Agent, or Firm—John A. Horan; Arthur A. Churm; Frank H. Jackson

[57] ABSTRACT

A lithium-depleted surface on a lithium niobate crystal is produced by bombarding the surface with ions, exposing the surface to an atmosphere containing water vapor, repeatedly washing the surface after decoration of the surface occurs and heating the crystal to about 320° C. Depletion of lithium in a surface layer may be accomplished in a pattern. The crystal is useful in optical second harmonic generation.

2 Claims, No Drawings

3,867,185

METHOD OF PRODUCING A LITHIUM-DEPLETED PATTERNED SURFACE ON A LITHIUM NIOBATE CRYSTAL

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a method of producing a lithium-depleted surface on a lithium niobate crystal. In more detail, the invention relates to a method of producing a lithium-depleted patterned surface on a lithium niobate crystal. The invention further relates to a method of varying the characteristics of a lithium niobate crystal for use in optical second harmonic generation.

It is known that lithium niobate crystals can be used in second harmonic generation from a laser beam. This technique is finding important applications in generating short wave radiation from longer wavelength lasers. The radiation generated can be used wherever coherent radiation can be used as in communications systems. For a general discussion of second harmonic generation see "Topics in Solid State and Quantum Electronics" (c) 1972 by John Wiley & Sons, Inc., pages 292 to 304 and for a discussion of the use of lithium niobate ($LiNbO_3$) for this purpose see "$LiNbO_3$: An Efficient Phase Matchable Nonlinear Optical Material" by Boyd et al. in Applied Physics Letters, Volume 5, Number 11, Dec. 1, 1964, pages 234–236. It is also known that second harmonic generation is most effective when the refractive indices have a particular ratio. The ratio varies with temperature and the temperature at which the particular ratio occurs is called the phase-matching temperature. The phase-matching temperature varies with composition of the crystal. See "Dependence of Second-Harmonic Phase-Matching Temperature in $LiNbO_3$ Crystals on Melt Composition" by Fay et al. in Applied Physics Letters, Volume 12, Number 3, Feb. 1, 1968, pages 89–91. Thus any method of depleting the lithium from a surface layer of a lithium niobate crystal finds utility in varying the characteristics of the crystal for use in second-harmonic generation.

SUMMARY OF THE INVENTION

According to the present invention, a lithium-depleted surface on a lithium niobate crystal is produced by bombarding the surface with ions, exposing the surface to an atmosphere containing water vapor, repeatedly washing the surface and heating the crystal to about 320°C.

SPECIFIC EMBODIMENT OF THE INVENTION

I have found that lithium niobate crystals when subjected to bombardment by accelerator-produced ions such as $He^+$, $H^+$, $D^+$, and $Ne^+$ undergo a surface change. Lithium migrates to the surfaces of the bombarded areas and forms LiOH crystals with moisture from the air. Washing removes these crystals, leaving an area over which the lithium concentration is reduced by a few percent. Subsequent heating to about 320°C immobilizes the remaining lithium ions and prevents further migration. The entire surface may be depleted of lithium ions or a mask over the surface may be used to produce a lithium-depleted patterned surface.

The lithium niobate crystals employed in this research were obtained from the Isomet Corp. Polished lithium niobate plates, 1 cm diameter and 1 mm thick in several orientations, X-, Z-, 36°Y, 60°Y-cuts were obtained as were some Z-cut plates which were obtained lapped only and polished later. The plates were bombarded with 150 kev (analyzed) ions — $H^+$, $D^+$, $He^+$ and $Ne^+$ — through apertures 80 × 100 mils, and 6 spots of different incident charge were placed on each plate. The incident charge given here is half the measured value to correct for secondary emission, but there is now some question about this correction factor; the value used may be too low.

These plates were observed over a period of 1½ years. Three kinds of storage were involved:

1. In pasteboard boxes, about 190 $cm^3$ volume. Humidity would have been close to laboratory humidity but lagging it somewhat and being less variable. 2. In glass or plastic chambers above water on a nichrome wire gauze. Humidity must have been nearly saturated.

3. In the laboratory atmosphere. In the hot and humid days of summer, relative humidity may have risen to 60 percent, in temperate weather it ranged from 20 to 45 percent, and in winter it was very low. Temperature was 74°F. ± 2°.

Several weeks after bombardment it was discovered that several bombarded areas had altered in appearance. It was suspected that a superficial deposit formed in the accelerator vacuum was responsible and the patterns were removed by rubbing vigorously with filter paper wet with acetone and alcohol. Several weeks later the patterns were observed to have formed again. The phenomenon was therefore a decoration and an investigation into its source and nature was launched.

It was found that all the bombarded areas on all the plates showed the decoration. Thus the type of ion, the dose and the orientation of the crystal are not critical.

It was observed that formation of drops occurs rapidly on the bombarded areas in humid chambers; when removed to a less humid atmosphere the drops evaporate, leaving a residue which causes the decoration. Decoration also occurred — but much more slowly — when the plates were left in the laboratory atmosphere during the warm period of the year; it did not occur during the cold period when laboratory humidity was but a few percent. Decoration did not occur by application of liquid water; condensation from the vapor was required. Nor did decoration occur on storage over N-dodecane (24°C.) or mercury (95°C.). Some slight selective condensation was seen over ethyl alcohol. No decoration was seen on ion-bombarded quartz or on ion-bombarded barium titanate ceramic; a faint decoration was seen on ion-bombarded lithium fluoride, but this decoration did not recur following washing.

It was discovered that the decoration occurs repeatedly after it is washed away. On some plates at least 7 such cycles were observed. The decoration is readily removed by washing with water.

The investigation indicated that the residue from the drops appearing on the bombarded areas in $LiOH.H_2O$ rather than $Li_2CO_3$ or $LiNbO_3$.

A photograph of one bombarded area on which the decoration had developed over a period of many months was scaled, the acicular crystals forming the decoration were counted, and their mean dimensions estimated. Assuming they were $LiOH.H_2O$, about $2 \times 10^{-7}$ moles/cm$^2$ were present, corresponding to the quantity of lithium present in 3 percent of the range (0.9 M) of the incident particles, protons.

It is thus evident that repeated washings of the crystal to remove the decoration phenomena deplete lithium from a surface layer of the crystal. Since the total depletion estimated in the example above was only 3 percent, it is possible to obtain a very fine adjustment of the proportion of lithium present in the surface layer by this technique. Before use, however, further migration of lithium atoms to the surface layer must be prevented and this is accomplished by heating the crystal to about 320°C. Prior to heating, the bombarded areas were elevated above the remaining surface, and the plate surface was convex about 1 fringe ($\sim$ ¼ $\mu$) over the 1 cm diameter. After the heatings, the plate was quite flat, the elevations had vanished, and the optical absorption was reduced to almost nil. Prior to heating the plate exhibited typical decoration phenomena. Following heating, the decoration phenomena no longer occurred.

It is believed that the lithium migrates to the surface in the electric field of the stressed piezoelectric. The process by which the decoration occurs is akin to deliquescence. It is necessary that the vapor pressure of the condensed phase be less than the vapor pressure of the condensate in the atmosphere; i.e., the aqueous vapor pressure depression must exceed unity less the relative humidity. The vapor pressure depression required is at least threefold greater than that which would result from saturating the solution with the most soluble, plausible constituent, $LiOH.H_2O$. While it is conceivable that a supersaturation could be produced starting from the liquid phase, it would hardly be possible to obtain the required concentrations starting from the solid phase. However, it is not necessary for the body of the solution to be so concentrated; such a concentration is required in the surface only. Transfer of ions to the surface could occur in the double layer formed in an electric field. Since the bombarded areas are highly stressed piezoelectric material, an electric field is present internally. Were the material homogeneous with plane surfaces, the electric field would not be experienced externally; but the surfaces are highly irregular (for this purpose), and (as will be indicated below) irradiation has rendered the solid inhomogeneous. The stress pattern in the stressed areas is nearly biaxial (at the edges, triaxial); and in the case of lithium niobate, the piezoelectric constants are such that a field would result, probably in all orientations. The stress in some of the areas approaches breaking strength (for crazing is observed on extended bombardment), which, in the thin layers involved, would be in excess of $10^5$ psi; and indeed, this corresponds to the observed strains. The resulting field would be $\sim 2 \times 10^5$ V/cm and would correspond to a surface charge $\sim$5,000 ESU/cm$^2$. The charge which can be moved by ferroelectric materials like lithium niobate is enormous because their dielectric constants are so high; it is enough to populate or depopulate by an appreciable fraction, the conduction bands of thin layers of conducting metals placed on their surfaces. However, this is not enough to change the vapor pressure appreciably; it would account for only about a 1 percent change in the vapor pressure of aqueous electrolytic solutions of the thickness encountered here. To account for the depression, it is necessary for the field to persist across the liquid in the decoration. The potential drop across the bombarded layer is estimated as $\sim$ 10 V. A potential drop of a few tenths of a volt across the liquid double layer would be sufficient to sweep most of the ions to the surface. Since there are $\sim 4 \times 10^7$ molecules/cm$^2$ resident on a water surface, $3.2 \times 10^7$ ions/cm$^2$ would be required in the surface to produce an 80 percent vapor pressure depression. For the case of droplets 2 $\mu$ in diameter and 1/4 $\mu$ high, volume $5 \times 10^{-13}$ cm$^3$, the mean concentration corresponding to this surface concentration would be $\sim$0.1 molar. Note that a saturated solution of lithium carbonate is 0.18 molar.

The embodiments of the invention in which an exclusive property or privilege is claimed are defined as follows:

1. A method of producing a lithium-depleted surface layer on a lithium niobate crystal comprising bombarding the crystal surface with $H^+$, $D^+$, $He^+$, or $Ne^+$ ions, exposing the bombarded crystal to an atmosphere containing water vapor whereby lithium hydroxide forms as a decoration on the surface, repeatedly washing the surface with water as the decoration phenomena occurs, and heating the washed crystal to about 320°C., thereby immobilizing the remaining lithium to prevent further lithium migration to the bombarded areas.

2. Method according to claim 1 wherein the atmosphere is saturated with water vapor.

* * * * *